United States Patent [19]
Maxwell et al.

[11] Patent Number: 5,860,391
[45] Date of Patent: Jan. 19, 1999

[54] ABSORBENTS CONTAINING ACTIVATED CARBONS

[75] Inventors: Jason R. Maxwell, Elgin; Jack A. MacPherson, Aurora; Robert T. Dorsey, Orland Park, all of Ill.

[73] Assignee: First Brands Corporation

[21] Appl. No.: 693,032

[22] Filed: Aug. 6, 1996

[51] Int. Cl.⁶ .................................................. A01K 1/015
[52] U.S. Cl. ............................................ 119/173; 119/171
[58] Field of Search ................................... 119/171, 172, 119/173

[56] References Cited

U.S. PATENT DOCUMENTS

| | | | |
|---|---|---|---|
| Re. 33,983 | 7/1992 | Hughes | 119/173 |
| 3,675,625 | 7/1972 | Miller et al. | 119/173 |
| 4,638,763 | 1/1987 | Greenberg | 119/1 |
| 4,793,837 | 12/1988 | Pontius | 55/316 |
| 5,000,115 | 3/1991 | Hughes | 119/173 |
| 5,019,254 | 5/1991 | Abrevaya et al. | 210/169 |
| 5,109,805 | 5/1992 | Baldry et al. | 119/173 |
| 5,129,365 | 7/1992 | Hughes | 119/173 |
| 5,224,975 | 7/1993 | Purnell et al. | 55/389 |
| 5,306,487 | 4/1994 | Karapasha | 424/76.6 |
| 5,407,442 | 4/1995 | Karapasha | 604/359 |
| 5,468,447 | 11/1995 | Bermas | 422/5 |
| 5,526,770 | 6/1996 | Kiebke | 119/171 |
| 5,647,300 | 7/1997 | Tucker | 119/173 |

FOREIGN PATENT DOCUMENTS

| | | | |
|---|---|---|---|
| 0566804 | 10/1993 | European Pat. Off. | 119/171 |
| 0020100 | 1/1988 | Japan | 119/173 |

*Primary Examiner*—Christopher A. Bennett
*Attorney, Agent, or Firm*—Gary L. Wamer

[57] ABSTRACT

The instant invention generally relates to absorbents containing effective odor absorbing amounts of activated carbon. The activated carbon-containing absorbents may also be formed in conjunction with a wide variety of adsorbent materials including bentonite, opaline silica and the like and are suitable for use as absorbents in a wide variety of absorbent application and are particularly well suited for use as animal litters. Such absorbent may also contain fluoropolymer dedusting agents and bactericides to form unique absorbent compositions with diverse properties and uses.

29 Claims, 2 Drawing Sheets

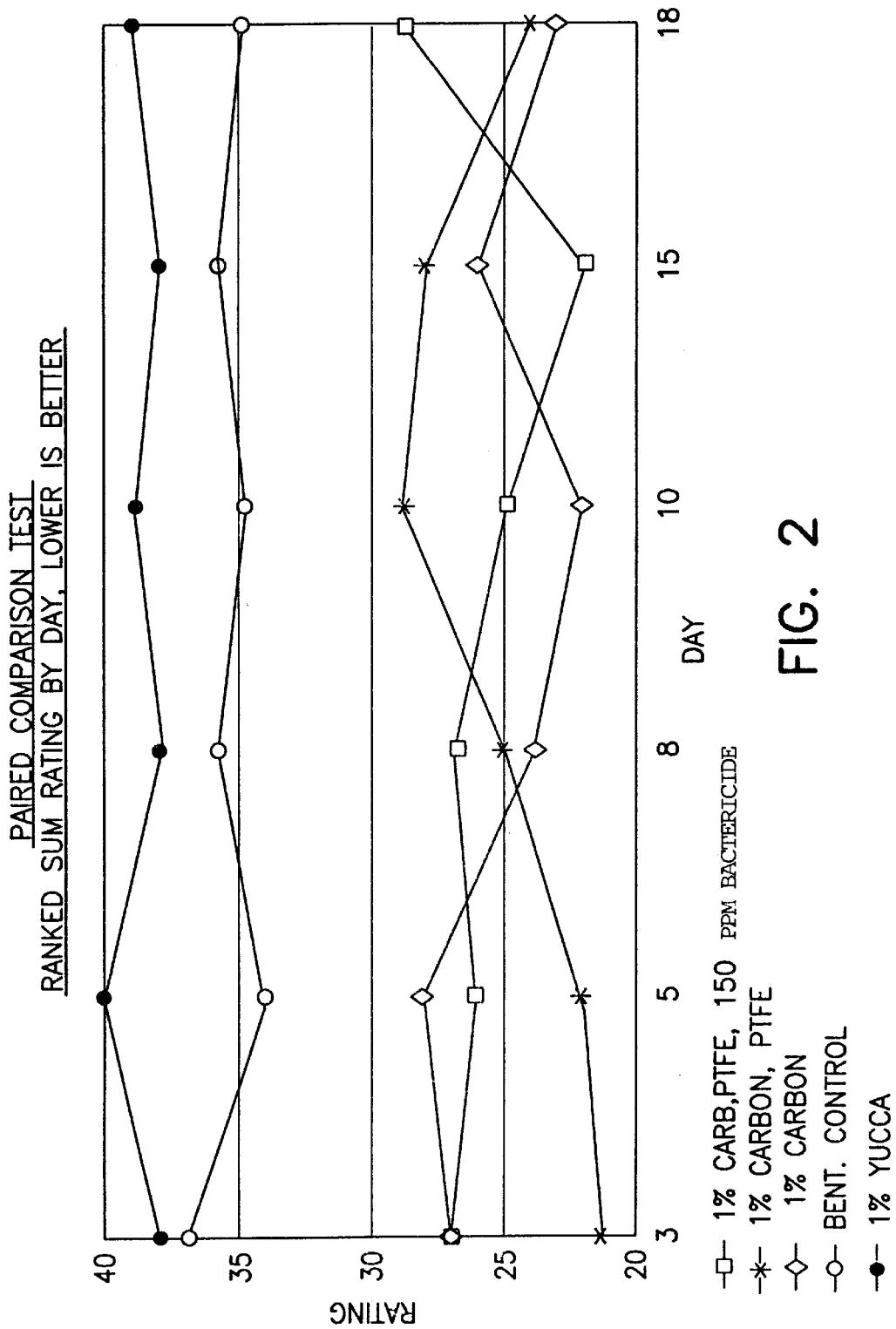

ABSORBENTS CONTAINING ACTIVATED CARBONS

FIELD OF THE INVENTION

The invention relates to absorbents and their use as absorbents for liquid and odor absorbing applications having associated therewith materials having malodors. These absorbents provide absorbency and improved odor abatement in a wide variety of uses. The activated carbon-based absorbents are particularly well suited for use as animal litters owing to their ability to absorb odors associated with animal urine and feces.

BACKGROUND OF THE INVENTION AND PRIOR ART DISCLOSURE

The absorbents of this invention may be used for a wide variety of absorbent\adsorbent (collectively referred to herein as "absorbent") applications. The absorbents are particularly well suited for use as animal litters and abatement of the odors commonly associated with use of such absorbents in animal litter boxes. A search of the prior art relating to animal litters located the following patents:

| U.S. PAT. NO. | DATE OF PATENT | PATENTEE |
|---|---|---|
| 2,649,759 | 8/1953 | Gibbs |
| 3,286,691 | 11/1966 | McFadden |
| 3,765,371 | 10/1973 | Fisher |
| 4,009,684 | 3/1977 | Kliment et al. |
| 4,275,684 | 6/1981 | Kramer et al. |
| 4,315,761 | 2/1982 | Larrson et al. |
| 4,343,751 | 8/1982 | Kumar |
| 4,395,357 | 7/1983 | Kramer et al. |
| 4,409,925 | 10/1983 | Brundett et al. |
| 4,459,368 | 7/1984 | Jaffee et al. |
| 4,494,481 | 1/1985 | Rodriguez et al. |
| 4,494,482 | 1/1985 | Arnold |
| 4,506,628 | 3/1985 | Stockel |
| 4,532,890 | 8/1985 | Ohki et al. |
| 4,570,573 | 2/1986 | Lohman |
| 4,591,581 | 5/1986 | Crampton et al. |
| 4,638,763 | 1/1987 | Greenberg |
| 4,641,605 | 2/1987 | Gordon |
| 4,657,881 | 4/1987 | Crampton et al. |
| 4,671,208 | 6/1987 | Smith |
| 4,685,420 | 8/1987 | Stuart |
| 4,686,937 | 8/1987 | Rosenfeld |
| 4,844,010 | 7/1989 | Ducharme et al. |
| 5,000,115 | 3/1991 | Hughes |
| 5,062,383 | 11/1991 | Nelson |
| 5,129,365 | 7/1992 | Hughes |
| 5,317,990 | 6/1994 | Hughes |
| 5,452,684 | 9/1995 | Elazier-Davis et al. |
| Re. 33,983 | 7/1992 | Hughes |
| 87001 | 8/1913 | EPO |
| 0087001 | 8/1983 | EPO |
| 0242478 | 10/1987 | EPO |
| 0378421 | 7/1990 | EPO |
| 0424001 | 4/1991 | EPO |
| 3620447A1 | 12/1987 | Fed. Rep. Germany |
| 58-009626 | 1/1983 | Japan |
| 0094043 | 5/1985 | Japan |
| 63-219323A | 3/1987 | Japan |
| 3044823 | 2/1988 | Japan |
| 3185323 | 7/1988 | Japan |
| 1191626 | 8/1989 | Japan |
| 58009626 | 7/1981 | Japan |
| 00094043 | 5/1985 | Japan |
| 1119127 | 6/1986 | Japan |
| 239932 | 10/1987 | Japan |
| 2239932 | 10/1987 | Japan |
| 1191626 | 1/1988 | Japan |
| 63-44822 | 2/1988 | Japan |
| 44823 | 2/1988 | Japan |

-continued

| U.S. PAT. NO. | DATE OF PATENT | PATENTEE |
|---|---|---|
| 3044822 | 2/1988 | Japan |
| 3044823 | 2/1988 | Japan |
| 185323 | 7/1988 | Japan |
| 3185323 | 7/1988 | Japan |
| 3219323 | 9/1988 | Japan |

The following patents relate to bentonite-containing animal litters: U.S. Pat. Nos.: 4,591,581; 4,657,881; 5,000,115; 5,129,365; 5,317,990; 5,452,684; and Re. 33,983 (hereinafter the "Hughes Patents"). Further, the foreign patents listed above (and other prior) may be located in the prosecution histories of the Hughes Patents.

Several patents disclose general use of activated carbon to absorb odors when used with absorbents for liquids in numerous absorbent applications, and include:

| U.S. PAT. NO. | PATENTEE |
|---|---|
| 4,638,763 | Greenberg |
| 4,793,837 | Pontius |
| 5,019,254 | Abrevaya |
| 5,224,975 | Purnell, et al. |
| 5,306,487 | Karapasha et al. |
| 5,407,442 | Karapasha |
| 5,468,447 | Bermas |

U.S. Pat. No. 4,638,763 discloses the use of anhydrous sodium sulfate in an animal litter to bind animal urine. In one embodiment the litter can also optionally contain approximately 2% by weight, based upon the weight of anhydrous sodium sulfate of activated carbon granules. The patentee does not designate any particular type of litter, generally including, clays, silica, limestone, vermiculite, sawdust and ground alfalfa among acceptable absorbent materials (column 1, lines 56 to 66). The amount of anhydrous sodium sulfate is stated to be from 0.5 to 4 parts per 100 parts (apparently by weight) of animal litter base with any optional activated carbon component being approximately 2% by weight of the anhydrous sodium sulfate. The patentee provides two examples which disclose a first composition formed from an unspecified clay and a second composition formed from sawdust. The patent states at column 3, lines 6 to 9 that "The purpose of the activated carbon granules is to absorb the odor producing substances which form part of, or are generated by, the feces and urine materials found in the litter." Based upon examples 1 and 2, the amount of activated carbon granules used by the patentee indicate the use is primarily as a chemical ingredient, since examples 1 and 2, respectively, employ 0.06 wt. % and 0.07 wt. % activated carbon granules, based on the total weight of the litter. The use of activated carbon granules in such small amounts as employed by the patentee, are clearly for some purpose other than odor absorption.

U.S. Pat. No. 5,407,442 discloses carbon-containing odor control compositions for a wide variety of uses to control malodors associated with body fluids. The particles are formed by combining white odor-controlling agents with activated carbon by means of binders. The patent also discusses the use of activated carbon and the general control of odor in sanitary products such as diapers, bandages and catamenials.

The prior art contains numerous patents on animal litters of various types. The use of animal litters having both clumping and nonclumping qualities are well established consumer products. Although consumers have used a wide variety of clay and non-clay materials with various additives to provide animal litters, the primary growth market for animal litters is in the area known as "clumping litters". The advantages stated to arise from clumping litters are the savings in the use of litter, the removal of used litter from a litter box and the associated removal of odor causing fecal matter and urine with the removed clumps of used litter. Although waste products are removed, the odors associated with the repeated use of the litter nonetheless is significant consumer complaint. This problem has been the subject of a large number of patents relating to various chemical additives to absorb and\or mask odors. These patents alternatively seek to react with ammonia and/or urea or serve as a masking agent for odors; e.g., fragrances.

The most widely used and best known material used for clumping litters is disclosed and claimed in the Hughes Patents, including U.S. Pat. No. Re. 33,983, i.e., water-swellable bentonites. Bentonite clays are routinely mined, dried, ground into a useable particle size distribution and sold for use in animal litter boxes, in particular, for use in feline litter boxes (a.k.a. cat litter boxes). Although the use of water-swellable bentonite materials as animal litter is well established and has grown in the last several years to represent a significant percentage of all animal litter sold, the use of such water-swellable bentonite materials has undergone little change or improvement over the last several years as to its odor control characteristics. Manufacturers have provided variations in fragrance, appearance, particle size and provided various other additives in an attempt to provide product differentiation to consumers in their bentonite-based litter products, but no significant changes in odor control during the use of animal litter in the litter box have been introduced.

The manufacturing process for bentonite-based litters generally involves a drying, grinding and sizing process for mined, field dried bentonite pursuant to which a ground bentonite product is put into containers and then sold to consumers. Several patents have specifically claimed the use of bentonite-containing clays for use as animal litters. The several patents issued to John Hughes (U.S. Pat. Nos.: 5,000,115, 5,129,365, 5,317,990 5,452,684; and Re. 33,983 of U.S. Pat. No. 5,000,115; the "Hughes Patents"; incorporated herein by reference thereto) disclose the use of a water-swellable bentonite clay for use as an animal dross absorbent. For example, Re. 33,983 discloses and claims the use of a water-swellable bentonite clay having a particle size from about 50 microns to about 3350 microns and having a sufficient amount of fine particles so that upon wetting, a substantial quantity of the clay will agglomerate.

Several commercially available consumer animal litters have been introduced as dedusted animal litters using fluoropolymers to reduce the dust (small particles which can become airborne during use) in bentonite-based litters. Such dedusting processes using fluoropolymers are generally known in the art as evidenced by the disclosure in U.S. Pat. Nos. 3,838,064; 3,993,584; 3,838,092; and 3,974,089; said patents incorporated herein by reference.

U.S. Pat. No. 5,109,805 discloses the use of a particular class of bactericides for use in animal litters to control bacterial growth during use of the animal litter.

The instant invention relates to absorbents containing activated carbon in an effective odor absorbing amount to provide odor absorbency when used as absorbents and in one embodiment to a litter formed from an inorganic absorbent base material, fluoropolymer and activated carbon. Other embodiments of the invention are discussed below.

DESCRIPTION OF THE FIGURES

FIG. 2 shows an odor absorbing comparison of a bentonite control absorbent, three activated carbon-containing absorbents according to this invention and a Yucca extract-containing absorbent.

SUMMARY OF THE INVENTION

Figure 1:
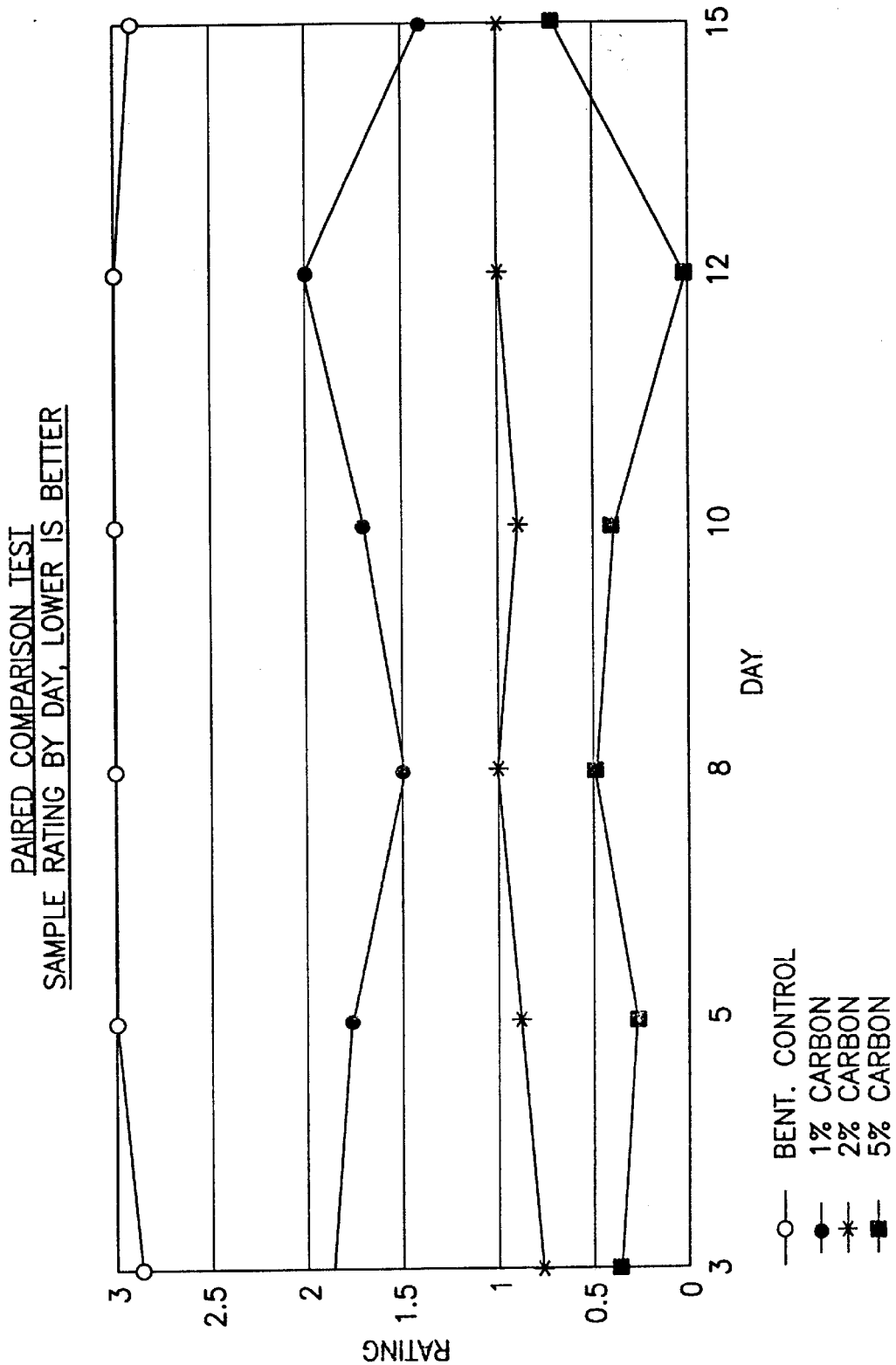
FIG. 1 shows an odor absorbing comparison of a bentonite control absorbent and three activated carbon-containing absorbents according to this invention.

The instant invention is directed to improved activated carbon-containing compositions for use as liquid and odor absorbent\adsorbent (collectively referred to herein as "absorbents") compositions, and are particularly well suited for use as animal litter, particularly feline animal litters, where odors are a common complaint from animal litter box users.

The instant invention also relates to activated carbon and bentonite-containing absorbents formed with an effective amount of a water-swellable bentonite to form a clumping litter having improved odor absorption properties during use in an animal litter box.

The improved odor absorbency of the instant activated carbon-containing absorbents is surprising in view of the wide variety of substrates which may be used in conjunction with the activated carbon to form the final adsorbent compositions. In general the increased odor absorbency provided by the activated carbon in these absorbents may be achieved with several different absorbent base materials in several different compositional formulae, including compositional formulae comprising dedusting amounts of fluoropolymers and, optionally, an effective amount of at least one bactericide.

DESCRIPTION OF THE INVENTION

The instant invention is directed to activated carbon-containing absorbent compositions for use as a liquid and odor absorbent, and are particularly well suited for use as animal litters, particularly feline animal litters.

The instant invention comprises the novel and non-obvious use of activated carbon in absorbent compositions and processes for their manufacture. In one embodiment activated carbon is employed with an absorbent base material and a fluoropolymer dedusting agent to form an odor absorbing absorbent having low dust formation useful for absorbing animal liquid waste products or other liquid materials and malodors associated therewith. In another embodiment activated carbon is employed with a clumping (water-swellable) bentonite as the absorbent material to form a clumping animal litter, and optionally is formed with a fluoropolymer dedusting agent. In the aforementioned embodiments a bactericide may also be employed, for example, the bactericide may be an aliphatic bromo-nitro bactericide in which the bromo- and nitro- groups are carried on the same carbon (as disclosed in U.S. Pat. No. 5,109,805, incorporated herein by reference).

The adsorbent material base which forms the activated carbon-containing compositions of the instant invention may be one or more of the inorganic materials used in absorbent ("absorbent" is used herein to denote both absorbent and adsorbent properties of such inorganic materials) compositions, including clays, opaline silica bentonite, attapulgite, montmorillonite, diatomaceous earths and the like.

As used herein activated carbon means absorbent carbon based materials, including activated and reactivated carbons, charcoals and other substantially carbon based absorbents. Activated carbons can be reactivated after initial use and in one embodiment the activated carbon employed is a reactivated coconut carbon. Such activated coconut carbons are available from Cameron/Great Lakes, Inc. of Wasco, Ill. under the trade designation CYPCC and are characterized as having a high surface area and a micropore structure. Activated carbon, including the compound commonly called activated charcoal, is an amorphous form of carbon characterized by high adsorptivity for many gases, vapors and colloidal solids. Carbon is generally obtained by the destructive distillation of coal, wood, nut-shells, animal bones or other carbonaceous materials, including coconuts. The carbon is typically "activated" or reactivated by heating to about 800°–900° C. with steam or carbon dioxide, which results in a porous internal structure. The internal surfaces of activated carbon typically average about 10,000 square feet per gram.

In one embodiment the absorbent composition contains an activated carbon which is a reactivated coconut carbon present in an effective amount, between about 0.1 wt. % and about 5 wt. %, preferably between about 0.5 wt. % and abut 2 wt. % activated carbon, sodium bentonite particles suitable for use as a clumping animal litter, preferably present in an amount between about 50 wt. % and about 99 wt. %. This animal litter may also contain effective amounts of a fluoropolymer, e.g., pollytetrafluoroethylenes such as TEFLON® or FLUON®, for controlling the dust which can arise during use of the animal litter and an effective antibacterial amount of a bactericide (such as claimed in U.S. Pat. No. 5,109,805) for controlling the presence of bacteria of the type commonly found in animal litters during their use.

In another embodiment the activated carbon-containing absorbent is an opaline silica-containing animal litter formed from opaline silica as the major absorbent material and, optionally, a fluoropolymer to control dust and, further, optional use of a bactericide to control bacteria of the type commonly found in animal litters during use in a litter box.

As discussed above, the activated carbon-containing absorbent can also include a fluoropolymer, such as a polytetrafluoroethylene sold under the trademarks TEFLON® or FLUON® in an effective dedusting amount. The use of such fluoropolymers as dedusting agents is disclosed in U.S. Pat. Nos. 3,838,064, 3,993,984, 3,838,092 and 3,974,089; said patents incorporated by reference thereto. The instant compositions can also contain a bactericide, in an effective antibacterial amount such as that disclosed in U.S. Pat. No. 5,109,805 (U.S. Pat. No. 5,109, 805 incorporated herein by reference thereto). The fluoropolymer component may be used as an aqueous solution by spraying the aqueous solution during dry blending of the absorbent base material(s) and the activated carbon so as to cause it to filibrate during addition. The fluoropolymer is preferably a polytetrafluoroethylene (PTFE) and may be added in an effective amount between about 0.01 wt. % and about 0.1 wt. %.

It has been observed that the activated carbon-containing animal litters can provide makedly noticable odor reducing benefits for animal odors in feline litter boxes when used in an effective amount of 1 wt. % activated carbon component with a particulate animal litter and is particularly well suited for use with water swellable sodium bentonite-based animal litters. Owing to the noticeable improvement in odor abatement and the relatively small amount of activated carbon in a bentonite-containing animal litter, the activated carbon component is primarily acting as an odor absorbent rather than as a liquid absorbent. Further, the nature of use of an activated carbon containing and bentonite-based clumping animal litter is unique and the benefits obtained are surprising. When an activated carbon containing litter is used as an odor absorbent in a litter box several inches of litter are spread over a large surface area; e.g., commonly an area of one (1) to two (2) square feet. During use, the animal using the litter box will soil a localized portion of the litter as the animal deposits body waste. The remaining area of the litter box containing unsoiled litter provides a litter box odor absorbing matrix into which odor emanating from the soiled litter area can be absorbed to reduce the overall adverse odor otherwise generated by the litter box. The unique ability of clumping animal litters to localize liquid and solid wastes to a portion of the litter provides a dispersion bed in which the activated carbon can be placed to absorb odors without coming into direct physical contact with the animal waste.

The activated carbon can be blended with other components during the manufacturing process and/or blended with other components after the litter is formed into a physical dry blended mixture, so long as the odor absorbing properties of the activated carbon are not compromised by the manufacturing process. The term "blended" is used here to cover the various methods by which the materials may be admixed simultaneously or sequentially to form a homogeneous mixture. For example, a litter base containing water-swelling sodium bentonite or other particulate base material (s) can be blended with an additive, such as a granular zeolite or a granular non-clumping clay such as attapulgite or a montmorillonite, prior to being admixed with the activated carbon. Alternatively, particles of a particulate base material, e.g., sodium bentonite, can be blended with other additives, including other absorbents after or while the activated carbon has been blended with the particulate base material. In one embodiment an animal litter is formed by mixing at substantially the same time the activated carbon and the particulate substrate and then while blending, sequentially adding an aqueous mixture of a fluoropolymer and then adding an aqueous mixture of an bactericide. Surprisingly, when this complex mixture of activated carbon, water swellable bentonite, a fluoropolymer dedusting agent and an antibacterial agent are blended, there are no observed detrimental interactions among the four components, that is, all four components retain their functionality in the final four component mixture. It has been observed that by blending the activated carbon with the bentonite while separately adding as aqueous media both the fluoropolymer and a bromo-nitro-bactericide, as above discussed, that the four functional components retain their functionality in the final animal litter. Surprisingly, a complex mixture of activated carbon, sodium bentonite, polytetrafluoroethylene and bactericide provide a final absorbent material characterized by liquid absorption, clumping ability, odor absorption, bactericide activity and low dust.

In a further embodiment between about 1 wt. % and about 5 wt. % activated carbon is dry blended with between about 50 wt. % and 99 wt. % of a clumping sodium bentonite and 0 wt. % to 49 wt. % of a nonclumping or poorly clumping particulate base material (the aforesaid weight percentages being based, respectively ,on the total weight of activated carbon, bentonite and optional nonclumping or poorly clumping material) and to this dry blend is added between about 0.01 wt. % and about 0.1 wt. % of a polytetrafluoroethylene (based upon the weight of the blend) and between about 20 and about 300 ppm of a bactericide (such as an aliphatic bromo-nitro-bactericide in which the bromo and nitro groups are carried on the same carbon).

As previously discussed, general use and description of bentonite clays for animal litters is disclosed in U.S. Pat. Nos.: 5,000,115; 5,129,365; 5,317,990; Re. 33,983; and 5,452,684. Such patents generally disclose the particle sizes for bentonite-containing clumping litters suitable for use as animal litters as between about $50\mu$ (microns) and about $3350\mu$, with $600\mu$ to about $3350\mu$ being preferred. As mentioned in the aforementioned patents, the water-swellable bentonite clay can be selected from the group consisting of sodium bentonite, potassium bentonite, lithium bentonite, calcium bentonite and magnesium bentonite; or combinations thereof. Further, bentonites which have been ion-exchanged with cations, such as ammonium or other quaternary ammonium cations or functionally similar cations can be used if the bentonite is still water-swellable.

Sodium bentonite is generally preferred particulate material for use in clumping animal litters, since sodium bentonite exhibits high water swelling and can be mined as naturally occurring bentonite deposits. In one embodiment the instant invention relates to an absorbent containing an activated carbon and a water-swellable sodium bentonite-containing particulate material. Such sodium-bentonite-containing absorbents may be used for a wide range of absorbent uses but are particularly well suited for use as animal litters. Animal litter products are typically characterized as having particles between various U.S. mesh sizes, such being used to screen the particles into fractions which are retained by the mesh size. Animal litters are typically sold as 12/40, 16/40, 8/25, 8/30 or 12/30 U.S. Mesh products, for example, based on standard U.S. mesh.

Although the particle size distribution for bentonite-containing animal litters is well known, it has been found that when manufacturing activated carbon-containing absorbents containing bentonite that it is beneficial to use different particle size distributions for the activated carbon component and the bentonite component to improve the blending of the components and to improve the homogeneity of the mixture to minimize separation of the blended components. Although not being bound to any particular theory, it is believed that the difference in particle size distributions is a function of the density difference between the bentonite absorbent and the activated carbon absorbent. In one embodiment the activated carbon is a 20/40 or 30/40 U.S. Mesh and the bentonite component is an 12\40 U.S. Mesh. It has been observed that if the activated carbon and bentonite are both 12\40 U.S. Mesh that the activated carbon and bentonite do not form a mixture of acceptable homogeneity.

In a further embodiment between about 1 and about 5 wt. % activated carbon is dry blended with between about 95 wt. % and about 99 wt. % of one or more nonclumping particulate base materials (for example, opaline silica, attapulgite, zeolite, montmorillonite and the like; the aforesaid weight percentages being based, respectively, on the total weight of activated carbon and particulate base material (s)) and to this dry blend is added an effective dedusting amount between about 0.01 wt. % and about 0.1 wt. % of a polytetrafluoroethylene fluoropolymer (based upon the weight of the blend) and between about 20 and about 300 ppm of a bactericide (such as an aliphatic bromonitro-bactericide in which the bromo and nitro groups are carried on the same carbon).

It has been found that the instant activated carbon-containing materials when formed in appropriate sizes are useful in a feline litter box and as a feline litter so as to cohesively agglomerate when wetted by feline urine or when in contact with moist fecal matter (such having surface moisture or liquid) to permit physical separation of the wetted, agglomerated bentonite masses from the litter box. It has also been observed that litter particles appreciably smaller than about 210 microns (70 mesh) are typically too small to be useful as animal litters for several practical reasons. First, as litter particle size becomes smaller a tendency exists for the litter to be increasingly tracked by the animal as the litter clings to its fur and is typically not heavy enough to fall off. Also, finer sized clay particles pack more tightly during use and do not offer sufficient void space between litter particles to permit animal urine to penetrate sufficiently deep into the bed of litter to form the clump. Further, litter particles appreciably smaller than about 210 microns (70 mesh) when used in animal litter tend to form thinner, flatter clumps which because of their shape tend to flex and break when mechanically agitated by a cat and/or when being scooped from the litter box.

It should be noted that the animal litter of the present invention can be used in litter boxes or in cages of a wide variety of animals including common pets, cats, dogs, gerbils, guinea pigs, mice and hamsters, rabbits, ferrets and laboratory animals (e.g., mice, rats, and the like). The animal litter of the present invention is especially useful for smaller household animals, such as cats. Surprisingly, the activated carbon-containing and water-swellable bentonite litter of the present invention has been found to have unexpected benefits in odor absorbency without adversely affecting the clumping of the bentonite when used to absorb feline urine and fecal matter. Further, such absorbents are useful for absorbing other odor generating waste liquids such as blood, vomit and other fluids excreted by animals.

The instant absorbents when containing bentonite or other clumping substrates can be used as a "clumping animal litter" to selectively remove liquid animal wastes from a weight of animal litter by: contacting the animal litter with liquid animal waste thereby producing an agglomerated mass (generally referred to as a "clump") comprising the animal litter and the liquid animal waste that is of sufficient size and of sufficient clumping strength to be removed from the litter and a remaining amount of litter; and removing the clump from the remaining amount of litter. Although the clump can be removed as a wet clump, owing to the use patterns of cat owners the clump is generally removed after it has dried at room temperature for a period of about 24 hours, thereby effectively removing the liquid animal waste from the remaining amount of litter. Owing to the moisture on the surface of solid animal wastes, the instant litters are also effective in adhering to solid animal wastes. In addition, the animal litter can be used with litter boxes of known designs. Such litter boxes are water-impermeable receptacles having disposed therein a litter comprising a absorbent composition according to this invention and capable of agglomerating upon wetting into a clump of sufficient size and of sufficient clump strength for physical removal of the clump from the litter box. The removal of the clump is without substantial adherence to an animal, when either a wet clump or dry clump form.

TESTING PROCEDURES—ODOR TEST
PAIRED COMPARISON TESTING PROCEDURE

The litter compositions set forth in the following examples were formulated and tested for their odor absorbing qualities using a paired comparison test to determine the efficacy of activated carbon-containing absorbent compositions to absorb odors. The paired comparison testing included the follow procedure:

1. Samples of each test absorbent were prepared by preparing 10 lbs of four or five experimental litters(as described in the examples). The litters were prepared by dry blending the sodium bentonite and activated carbon components and then separately adding any PTFE, bactericide or other additive shown. The litters were placed in and evaluated in identical covered litter boxes having an opening through which a test panelist can smell any odor generated by the liter box. Each test panelist was instructed to evaluate the odor generated by the litter box and compare the odor as between two paired litter boxes.

2. Each litter box was inoculated with a preselected amount of a test animal urine and feces mixture on each weekday (except Wednesdays) in the afternoon at the same time until the odor test was completed. The clumps after each addition of the urine/feces mixture were covered by litter in the litter box. The clumps in each litter box were uncovered just before starting each paired comparison test. The clumps were kept buried at all other times.

3. Paired comparison tests for each group of litter compositions were conducted on three (3) day intervals, except where indicated.

4. Each odor test employs at least ten (10) different judges for the paired comparison testing. In this test each judge was asked to compare two samples and asked to choose the sample having more malodor. As a result of the pairing of the samples each sample is compared each of the other samples. At least 10 minutes of non-testing time is allowed between individual judges to allow the head space in the litter box to equilibrate.

5. The litter boxes are scooped once a week on the same test day until the test is completed with the litter box being scooped before adding fresh urine/feces for the day.

EXAMPLE 1

Four test litters were prepared to evaluate the odor absorbing properties of activated carbon in a sodium bentonite-containing animal litter. The four litters were prepared using the same naturally occurring sodium bentonite as the control litter. To this bentonite control litter were added 1 wt. %, 2 wt. % and 5 wt. % of a reactivated coconut carbon to prepare three test litters. The four litters were tested in a paired comparison odor evaluation test as described above with each judge rating the litters based on which litter in a given paired comparison had the greater malodor. In this paired comparison each litter was compared with each of the other litters ten (10) times each test day. The results of the paired comparison are set forth in Table 1.

Table 1 shows that the bentonite only litter was deemed by the judges to have the greater malodor. All samples containing activated carbon were rated as having less odor on each test day. These results are graphically depicted in FIG. 1.

TABLE 1

PAIRED COMPARISON TEST

SAMPLE RATING BY DAY, LOWER IS BETTER

| DAY | BENTONITE CONTROL | 1% ACTIVATED CARBON | 2% ACTIVATED CARBON | 5% ACTIVATED CARBON |
|---|---|---|---|---|
| 3 | 2.9 | 1.9* | 0.8* | 0.4* |
| 5 | 3.0 | 1.8* | 0.9* | 0.3* |
| 8 | 3.0 | 1.5* | 1.0* | 0.5* |
| 10 | 3.0 | 1.7* | 0.9* | 0.4* |
| 12 | 3.0 | 2.0* | 1.0* | 0.0* |
| 15 | 2.9 | 1.4* | 1.0* | 0.7* |

*BETTER THAN THE CONTROL WITH A 95% CONFIDENCE LEVEL.

EXAMPLE 2

Five (5) test litters were prepared to evaluate the ordor absorbing properties of activated carbon in a sodium bentonite-containing animal litter. The five (5) litters were prepared using a naturally occurring sodium bentonite as the control litter. To this bentonite control litter the following were added to prepare four additional test litters: 1) 1 wt. % reactivated coconut carbon; 2) 1 wt. % reactivated coconut carbon and 0.025 wt. % polytetrafluoroethylene; 3) 1 wt. % reactivated coconut carbon, 0.025 wt. % polytetrafluoroethylene and 150 ppm of an aliphatic bromo-nitro-bactericide in which the bromo and nitro groups are carried on the same carbon; and 4) 1 wt. % of a natural Yucca extract.

The four (4) litters were tested in a paired comparison odor evaluation test as described above with each judge rating the litters based on which litter in a given paired comparison had the greater malodor. In this paired comparison each litter was compared with each of the other litters five (5) times each test day. The results of the paired comparison are set forth in Table 2.

Table 2 shows that the bentonite only and bentonite\Yucca extract litters were deemed by the judges to have the greater malodor. All three samples containing activated carbon were rated as having less odor on each test day. These results are graphically depicted in FIG. 2.

TABLE 2

PAIRED COMPARISON TEST

RANKED SUM RATING BY DAY, LOWER IS BETTER

| DAY | BENTONITE CONTROL | 1% CARBON | 1% CARBON PTFE | 1% CARBON, PTFE 150 PPM Bactericide | 1% YUCCA |
|---|---|---|---|---|---|
| 3 | 37 | 27* | 21* | 27* | 38 |
| 5 | 34 | 28* | 22* | 26* | 40 |
| 8 | 36 | 24* | 25* | 27* | 38 |
| 10 | 15 | 22* | 29* | 25* | 39 |
| 15 | 36 | 26* | 28* | 22* | 38 |
| 18 | 35 | 23* | 24* | 29* | 39 |

*BETTER THAN THE CONTROL WITH A 95% CONFIDENCE LEVEL.

We claim:

1. An absorbent comprising an effective odor absorbing amount of an activated carbon and an effective amount of a water-swellable bentonite-containing material for use as an absorbent composition.

2. An absorbent according to claim 1 wherein said bentonite particles have said particles about 12\40 U.S. mesh and said activated carbon particles have a size about 20\40 US mesh.

3. An absorbent according to claim 1 wherein said absorbent contains at least 50 wt. % of a water swellable bentonite, at least 0.5 wt. % activated carbon and at least 0.01 wt. % of a fluoropolymer.

4. An absorbent according to claim 1 wherein said absorbent contains an effective amount of a bactericide.

5. An absorbent according to claim 1 wherein said absorbent has at least 50 wt. % of its particles in the 12\40 or 8\25 U.S. mesh range.

6. An absorbent according to claim 3 wherein at least one additional absorbent material other than bentonite is added in an amount between about 5 wt % and about 50 wt %, based on the total weight of said absorbent.

7. An absorbent according to claim 6 wherein said additional absorbent material is selected from the group consisting of zeolites, fullers earth, attapulgite, montmorillonite diatomaceous earth, absorbent organic polymers, cellulosics, opaline silica and mixtures thereof.

8. An absorbent according to claim 1 wherein said litter contains an effective amount of an additive selected from the group consisting of colorants, pH-control agents, clumping agents, desiccants, and mixtures thereof.

9. An absorbent according to claim 3, wherein said absorbent comprises between about 0.5 wt. % and 5 wt. % activated carbon, between about 50 wt. % and about 99 wt. % sodium bentonite, between about 0.01 wt. % and about 0.1 wt. % polytetrafluoroethylene polymer and between about 20 ppm to 300 ppm of an aliphatic bromo-nitro-bactericide in which the bromo and nitro groups are carried on the same carbon.

10. An animal litter having liquid absorbency for animal urine and containing an effective odor controlling amount of activated carbon, an absorbent material for animal waste material comprising sodium bentonite and an effective dedusting amount of fluoropolymer.

11. The animal litter of claim 10 where said fluoropolymer is a polytetrafluoroethylene and where said animal litter further contains an effective amount of a bactericide.

12. The animal litter of claim 11 wherein an additional absorbent material is selected from the group consisting of montmorillonite, opaline silica, zeolites, fullers earth, attapulgite, diatomaceous earth and mixtures thereof.

13. An animal litter according to claim 12 containing at least 50 wt. % of a clumping sodium bentonite capable of agglomerating upon wetting into a clump of sufficient size and of sufficient clumping strength for physical removal of the clump from the litter, said clump capable of being removed from the litter box as a wet clump or after drying at room temperature.

14. An animal litter according to claim 10 wherein said bentonite-containing material consists essentially of a clumping sodium bentonite.

15. An animal litter according to claim 10 wherein the animal litter has at least 80 wt. % of the particles in the 12/40 U.S. mesh range.

16. An animal litter according to claim 10 wherein the animal litter has at least 80 wt. % of the particles in the 8/25 U.S. mesh range.

17. An animal litter according to claim 10 wherein at least one nonclumping or poorly clumping absorbent material is added in an amount greater than 50 wt. % based on the total weight of said animal litter.

18. An animal litter according to claim 17 wherein said animal litter contains opaline silica as said nonclumping absorbent material and contains an adhesive binder for forming a clumping animal litter therefrom.

19. An animal litter according to claim 18 wherein said adhesive binder is selected from the group consisting of guar gums, hydroxymethycellusose ethers and carboxymethyl cellulose ethers.

20. An animal litter according to claim 10 having improved odor absorbency for use in a litter box and having a size suitable for use in a litter box and capable of agglomerating upon wetting into a clump of sufficient size for physical removal of the clump from the litter box.

21. The animal litter of claim 20 wherein at least 80 wt. % of the animal litter has a particle size for use as an animal litter selected from the group consisting of U.S. mesh size distributions 12/40, 8/25, 8/30, 12/30 or 16/40.

22. An animal litter comprising between about 0.5 wt. % and about 5 wt. % activated carbon, between about 95 wt. % and about 99 wt. % of one or more particulate base materials, between about 0.01 wt. % and about 0.1 wt. % of a polytetrafluoroethylene polymer and between about 20 ppm and about 300 ppm of an aliphatic bromo-nitro-bactericide in which the bromo and nitro groups are carried on the same carbon.

23. An animal litter according to claim 22 comprising about 1 wt. % activated carbon and about 99 wt. % sodium bentonite.

24. An animal litter according to claim 22 wherein said particulate base material is selected from the group consisting of sodium bentonite, montmorillonite, attapulgite, zeolites, opaline silica, diatomaceous earths and mixtures thereof.

25. The method of selectively removing liquid animal wastes from a weight of animal litter comprising:

contacting the animal litter of claim 10 with liquid animal waste thereby producing a clump comprising the animal litter and the liquid animal waste that is of sufficient size and of sufficient strength to be removed from the litter and the remaining amount of litter; and removing the clump from the remaining amount of litter as a wet clump or after said clump has dried at room temperature for a period of time, thereby removing the liquid animal waste from the remaining amount of litter.

26. The method of selectively removing liquid animal wastes from a weight of animal litter comprising:

contacting the animal litter of claim 22 with liquid animal waste thereby producing a clump comprising the animal litter and the liquid animal waste that is of sufficient size and of sufficient strength to be removed from the litter and the remaining amount of litter; and removing the clump from the remaining amount of litter as a wet clump or after said clump has dried at room temperature for a period of time, thereby removing the liquid animal waste from the remaining amount of litter.

27. A litter box comprising a water-impermeable receptacle having disposed therein the animal litter of claim 10 capable of agglomerating upon wetting into a clump of sufficient size and of sufficient clumping strength for physical removal of the clump from the litter box and absorbing litter box odor.

28. A method for manufacturing an activated carbon-containing absorbent comprising the steps of 1) blending an effective amount of activated carbon and an absorbent material;

2) adding an effective dedusting amount of an aqueous solution of a fluoropolymer to said blend as such dry blend is mixing.

29. A method according to claim 28 comprising the additional step of:

3) adding an effective amount of a bactericide to said dry blend as such blend is mixing.

* * * * *